(12) United States Patent
Jabusch

(10) Patent No.: US 7,424,984 B2
(45) Date of Patent: Sep. 16, 2008

(54) BELT RETRACTOR-BELT TENSIONER-COMBINATION WITH TENSIONING DRIVE INTEGRATED INTO THE BELT SHAFT

(75) Inventor: Ronald Jabusch, Elmshorn (DE)

(73) Assignee: Autoliv Development AB (SE)

( * ) Notice: Subject to any disclaimer, the term of this patent is extended or adjusted under 35 U.S.C. 154(b) by 476 days.

(21) Appl. No.: 10/523,472

(22) PCT Filed: Jul. 12, 2003

(86) PCT No.: PCT/EP03/07554

§ 371 (c)(1), (2), (4) Date: Feb. 3, 2005

(87) PCT Pub. No.: WO2004/014704

PCT Pub. Date: Feb. 19, 2004

(65) Prior Publication Data

US 2005/0247810 A1 Nov. 10, 2005

(30) Foreign Application Priority Data

Aug. 3, 2002 (DE) ............................... 102 35 543

(51) Int. Cl.
*B60R 22/46* (2006.01)
(52) U.S. Cl. ..................................... 242/374; 242/379.1
(58) Field of Classification Search ................. 242/374, 242/379.1, 382, 383, 384; 280/805, 806, 280/807; 297/472, 475, 476, 477, 478, 480
See application file for complete search history.

(56) References Cited

U.S. PATENT DOCUMENTS 4,142,692 A * 3/1979 Andres ....................... 242/374
4,191,344 A * 3/1980 Tillac ......................... 242/374
4,213,581 A * 7/1980 Andres et al. ............... 242/374
4,232,836 A * 11/1980 Fohl ........................... 242/374
4,371,125 A * 2/1983 Andres et al. ............... 242/374
5,699,976 A * 12/1997 Hori ........................... 242/374
5,788,176 A 8/1998 Weyhmueller et al.
5,842,657 A * 12/1998 Modzelewski .............. 242/374

(Continued)

FOREIGN PATENT DOCUMENTS

EP 0 940 307 9/1999

*Primary Examiner*—Peter M. Cuomo
*Assistant Examiner*—Scott Haugland
(74) *Attorney, Agent, or Firm*—Robert W. Becker & Assoc; Robert W. Becker

(57) ABSTRACT

Disclosed is a self-locking safety belt retractor comprising a blocking element which can be triggered in a belt band-sensitive and/or vehicle-sensitive manner and blocks the rotation of the belt shaft in the unwinding direction of the belt, and a tensioning drive which acts upon the belt shaft and rotates said belt shaft in the winding direction of the safety belt when being triggered. The inventive safety belt retractor is characterized by the fact that the tensioning drive which is provided with two parts (14, 15; 26, 32) that move relative to each other when said tensioning drive is triggered, is disposed on the belt shaft without being connected to the housing (10) of the belt retractor and rotates along with the belt shaft before being triggered. Furthermore, one part of the tensioning drive is fixed by means of the blocking element (17) as an abutment for the tensioning movement of the second part of the tensioning drive when the tensioning drive is triggered.

12 Claims, 3 Drawing Sheets

U.S. PATENT DOCUMENTS

| | | |
|---|---|---|
| 5,881,962 A | 3/1999 | Schmidt et al. |
| 6,047,914 A | 4/2000 | Sasaki |
| 6,065,704 A * | 5/2000 | Pywell et al. ............... 242/374 |
| 6,065,706 A | 5/2000 | Koning |
| 6,105,893 A | 8/2000 | Schmidt et al. |
| 6,360,981 B1 * | 3/2002 | Specht ................... 242/390.8 |
| 6,708,914 B2 * | 3/2004 | Stevens ...................... 242/374 |
| 2001/0006204 A1 | 7/2001 | Kajiyama |

* cited by examiner

BELT RETRACTOR-BELT TENSIONER-COMBINATION WITH TENSIONING DRIVE INTEGRATED INTO THE BELT SHAFT

BACKGROUND OF THE INVENTION

The invention relates to a self-locking seatbelt retractor with a blocking element that can be triggered in a belt-sensitive and/or vehicle-sensitive manner for blocking the rotation of the belt shaft in the unwinding direction and with a tensioning drive that acts upon the belt shaft and that, upon triggering, rotates the belt shaft in the wind up direction of the security belt.

A seatbelt retractor with the state of the art features is described in DE 196 09 524 A1. In this connection, a tensioning drive is configured as a pyrotechnic cable tensioner that, upon triggering, sets a drive plate into rotation. The drive plate is connectable with the belt shaft via a centrifugal force coupling in the form of a radially outwardly displaceable rotation acceleration tensioner, so that the rotational movement of the drive plate in the belt wind up direction is transmitted over to the belt shaft.

To the extent that there occurs, at the conclusion of the tensioning process, a rotation of the belt shaft in the extension direction by reason of the commencing advance shifting of the belted-in passenger, which rotation is to be prevented by the belt retractor-side blocking element, this known configuration has the disadvantage associated therewith that a certain rotational path of the belt shaft in the belt wind up direction is required for a steering in of the blocking element after the conclusion of the tensioning movement before the blocking element is controlled into position and the further withdrawal of the seatbelt is blocked. Additional disadvantages to be noted include the factor that the configuration of an appropriate coupling between the belt shaft and the tensioning drive is expensive and, finally, the arrangement of the tensioning drive on the housing of the belt retractor and their fixed connection with one another brings with it a corresponding requirement for space to accommodate this arrangement.

The invention solves the challenge, with respect to a self-locking seatbelt of the above-noted art, of shortening, in particular for the blocking of the belt shaft following the conclusion of the tensioning movement, the requisite turn around path that exists until the engagement of the blocking element and, also, solves the challenge of reducing the size of the belt retractor-belt tensioner-combination.

SUMMARY OF THE INVENTION

The solution to this challenge is set forth in advantageous configurations and further embodiments of the invention recited in the subject matter of the patent claims that follow this description.

The invention provides in its core concepts that the tensioning drive, which comprises two components that are set into relative movement relative to one another upon the triggering of the tensioning device, is arranged without a connection to the housing of the seatbelt retractor on the belt shaft and rotates in common, before its triggering, with the belt shaft, and that the blocking element is retained on a first component that, upon triggering of the tensioning drive, initially initiates a rotation in the pull out direction and is, via the movement of the first component, controlled into its blocking position, and the belt shaft is connected with the other— namely, the second—component of the tensioning drive, which second component is rotated in the wind up direction by reason of the application of the drive force occurring in connection with the fixedly disposed first component, whereby a reverse movement stop is arranged between the first and second components of the tensioning drive that is continuously effective in the extension direction and that runs in a free running condition in the wind up direction. Thus, a significant feature of the invention is that the total tensioning drive is integrated in the belt shaft, whereby, to introduce the tensioning movement, the belt shaft on the otherwise available blocking system of the belt retractor is engaged by the blocking element that is triggered in a belt-sensitive and/or vehicle-sensitive manner in the normal operation of the belt retractor. Thus, a discrete coupling between the tensioning drive and the belt shaft is no longer required.

While during the tensioning driving a movable component coupled with the belt shaft such as a piston or a rotor is, via the tensioning energy that is typically produced such as, for example, a pyrotechnically produced gas or, as well, an electrical energy, moved relative to a fixedly located housing of the tensioning drive that is connected with the belt retractor housing, the uniqueness of the inventive belt retractor-belt tensioner-combination is more so that the movable component of the tensioning drive that is movable in the unwinding direction at the beginning of the tensioning process is fixedly locked to the housing via the blocking element that is retained on this movable component and, thus, this movable component forms the end stop for the subsequent relative movement that takes the form of a reverse rotation of the "housing" acting in the role of the second component of the tensioning drive in the wind up direction. To this extent, the function of both components of the tensioning drive changes during the tensioning process, because the first component is transformed from a moveable component into a fixedly disposed component and the second component is transformed from, initially, a quasi-fixedly located component into a component that transmits the tensioning movement.

A reverse movement stop is provided as the sole additional component, the reverse movement stop being disposed between the first and second components of the tensioning drive, continuously effective in the pull out direction, and, following the conclusion of the tensioning movement, preventing a reverse rotation of the belt shaft in the extension direction. As the continuously effective reverse movement stop does not require any steering in or turn around-path, the belt shaft is, at the end of the tensioning process, directly blocked in the extension direction by reason of the renewed engagement of the blocking element in a teeth arrangement fixedly set in the housing.

Thus, a further advantage of the invention is that a fixed connection between the tensioning drive and the housing of the belt retractor is not created. Thus, there is a saving of space and on additional components and, as well, force flows are avoided because resort is had to the force flow paths applied on the belt retractor.

In accordance with one embodiment of the invention, it is provided that the reverse movement stop is configured as a ratchet stop with a latch that moves out of ratchet engagement with a tooth arrangement upon rotation in the wind up direction; in this manner, it is ensured that the latch remains constantly in engagement with the teeth arrangement to prevent a rotation of the belt shaft in the extension direction, so that, as well during normal operation of the belt retractor after the belt-sensitive and/or vehicle-sensitive controlled-in blocking of the blocking element, the force flow is effected via the tensioning drive and the intermediately operated reverse movement stop.

In accordance with a first embodiment of the invention, it is provided that the tensioning drive is configured as an electro-motor whose stator forms the shaft body that acts as a support for the seatbelt in the role of the second component and whose rotor that retains the blocking element is in the role of the first component. In this connection, the stator serves directly as a shaft body onto which the belt of the seatbelt retractor is wound. In the condition of an electro-motor having no current flow thereto, the rotor and the stator rotate, respectively, in combination with one another, whereby, in the event of a belt-sensitive and/or vehicle-sensitive controlled swinging out of the blocking element rotatably supported on the rotor into its blocking position by reason of the reverse movement stop that is continuously effective in the pull out direction, there occurs, as well, a blocking of the rotational movement in the pull out direction of the stator in its role as a shaft body.

Insofar as a state of the art seatbelt retractor as described in state of art-characterizing DE 196 90 524 A1 comprises, in any event, a force limiting device configured as a torsion bar, it is herein provided that the torsion bar is arranged in the interior of the rotor and is connected on its one end in a form-fitting manner with a profile head serving as a support for the blocking element retained thereon and is connected on its opposite end in a form-fitting connection with the rotor. In this event, the stator in its role as a shaft body is directly connected, via structures designed to give way at a preset force application, with the profile head that supports the blocking element so that there occurs, in conventional manner via this approach, the blocking of the belt shaft during normal operation of the belt retractor.

In an alternative embodiment of the invention, it is provided that the tensioning drive is configured as a pyrotechnic drive with a housing connected to a shaft body supporting the belt in the role of the second component and with at least one drive piece arranged in the housing that is effective on a drive shaft acting in the role as a support for the blocking element and is flow-contacted by the gas produced from a gas generator upon the triggering of the tensioning drive in the role of the first component. In this connection, it is provided in accordance with a first embodiment of the invention that the drive piece is configured from a piston that is flow-contacted by the gas, whereby, for the purpose of a symmetrical force transmission in the event of a triggering, it can be provided that pistons are respectively arranged on both sides of the drive shaft in a symmetrical arrangement. While, in connection with a conventional pyrotechnic drive as described in the state of the art publication DE 196 09 524 A1, the movement of the piston relative to the housing of the tensioning drive is converted into wind up movement of the belt shaft, in connection with this inventive embodiment, the commencing movement of the piston is solely exploited in order to swing out into its blocking position the blocking element that is coupled with the piston by the intermediately activated drive shaft. Thereafter, the piston of the tensioning drive is fixedly set in a preset position and the further effect of the gas generated by the gas generator leads to a rotation of the housing of the tensioning drive connected with the shaft body.

To convert the drive movement of the piston into the rotational movement of the driveshaft that retains the blocking element, it can be provided, in accordance with alternative embodiments of the invention, that the driveshaft and the piston are coupled with one another via meshing teeth in a manner such that the linear movement of the piston is, upon triggering of the tensioning drive, converted into a rotational movement of the driveshaft or that there is wound onto the driveshaft a belt that is guided over the piston and is secured to the housing such that the linear piston movement leads to an unwinding of the belt from the driveshaft and, consequently, leads to a rotation of the housing relative to the fixedly retained driveshaft.

To the extent that the drive piece is configured via a cooperative working arrangement of the piston and the belt, it can be provided, in accordance with an embodiment of the invention, that the deployment of the piston is omitted so that the belt is directly flow-contacted. In this connection, it is provided, in further details, that a belt is wound onto the driveshaft and a pre-arched chamber, disposed in the path of the flow of the gas, is closely disposed to the housing such that the flow-contacting of the belt leads to an unwinding of the belt from the driveshaft and, consequently, a rotation of the housing relative to the fixedly set driveshaft.

Also, in connection with those embodiments of the invention having a pyrotechnic drive, the integration of a torsion bar as a conventional force limiting device is possible in that the driveshaft is configured as an inner disposed torsion bar that is driven by the piston at its end arranged relative to the tensioning drive and is connected at its opposite end with a profile head serving as a support of the blocking element, whereby the shaft body is connected with the profile head via structures designed to give way at a preset force application.

It can be provided in an advantageous manner that the gas generator is arranged on a fixedly set cover of the seatbelt retractor and extends with its gas exhaust region into a partitioned gas space configured in the housing of the tensioning drive.

BRIEF DESCRIPTION OF THE DRAWINGS

The embodiments of the invention are set forth in more detail in the drawings that are hereinafter described. These drawings show.

DESCRIPTION OF SPECIFIC EMBODIMENTS

Figure 1:
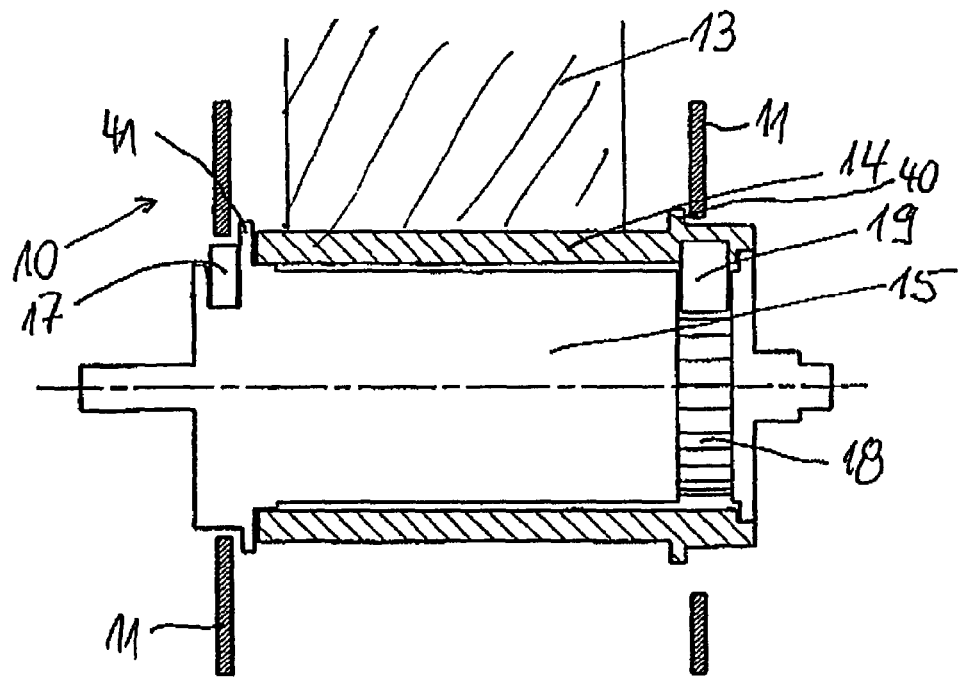
FIG. 1 a schematic side view of a seatbelt retractor with an integrated tensioning drive configured as an electro-motor, FIG. 2 a view of the seatbelt retractor corresponding to that of FIG. 1 with an integrated torsion bar, FIG. 3 a schematic side view of the seatbelt retractor with the tensioning drive configured as a pyrotechnic drive, FIG. 4 a schematic back view of the housing of the tensioning drive with the piston arrangement for initiating the triggering of the tensioning drive, FIG. 5 a view of the subject matter of FIG. 4 during the tensioning process.

The belt retractor-belt tensioner-combination schematically shown in FIG. 1 comprises an U-shaped housing 10 in whose shanks or side legs 11 a shaft body is rotatably disposed onto which a belt designated as 13 is wound. To the extent that the tensioning drive illustrated in the embodiment shown in FIG. 1 is configured as an electro-motor, the stator 14 of the electro-motor serves as the shaft body supporting the belt 13, the stator forming on a flange 40 on the right side, relative to the embodiment shown in FIG. 1, of the shaft body, the bearing in the associated shank 11 of the housing 10. The rotor 15 associated with the electro-motor is arranged in the interior of the stator 14, the rotor, on the end thereof lying opposite to the flange 40, extending outwardly over the stator 14 and forming, via a flange 41 configured thereat, the other bearing location for the belt shaft bearing. A blocking element 17 is rotatably supported on the back side of the shank 11 and is controllable into engagement with teeth formed on the shank 11 such that, in the condition of the blocking element 17 being outwardly moved, the rotation of the rotor 15 relative to the housing 10 is blocked. As is not further illustrated and is otherwise known from the respective prior art, the blocking element 17 is subjected to a belt-sensitive and/or vehicle-sensitive steering in during normal operation of the seatbelt retractor. A reverse movement stop is further provided between the rotor 15 and the stator 14 having a latch 19 rotatably supported on the stator 14 and, in the wind up direction, in continuous engagement with teeth 18 formed on the rotor 15, whereby free, non-engaging movement of the latch in the wind up direction permits a relative rotation between the stator 14 and the rotor 15.

In normal operation of the belt retractor, the stator 14 and the rotor 15 are rotated by the winding up movement or, respectively, the pull out movement, of the belt that is transmitted by the rotational movement of the shaft body; in the event a swinging out of the blocking element 17 rotatably supported on the rotor 15 occurs due to a belt-sensitive and/or vehicle-sensitive control system, the rotor 15 is fixedly set to execute its rotational movement in the wind up direction and, by virtue of the reverse movement stop 18, 19 that is, in any event, active in the winding up direction, the stator 14 in its role as a shaft body is blocked, so that the unwinding movement of the belt 13 is prevented.

In the event of a triggering of the tensioning drive, there occurs a flow of current to the electro-motor initially leading to a rotation of the rotor 15 in the belt unwinding direction and, via this rotation, the blocking element 17 is controlled into the teeth associated with the shank 11. Once the rotor 15 is constrained to follow a given path in its rotational direction, the flow of current to the elector-motor leads to the condition that the stator 14 rotates in an opposite rotational direction— that is, in the winding direction (arrow 36)—relative to the fixedly set rotor 15, whereby, in this relative rotational direction, the latch 19 moves outwardly of the teeth 18 to be in its free, non-engaging movement. After the completion of the tensioning process, the stator 14 serving in its role as a shaft body is, upon an ensuing belt unwinding movement, coupled via the immediately effective reverse movement stop 18, 19 to the rotor 15 that has been fixedly set in its position via the engagement of the blocking element 17, so that no further belt unwinding movement is possible.

Figure 2:
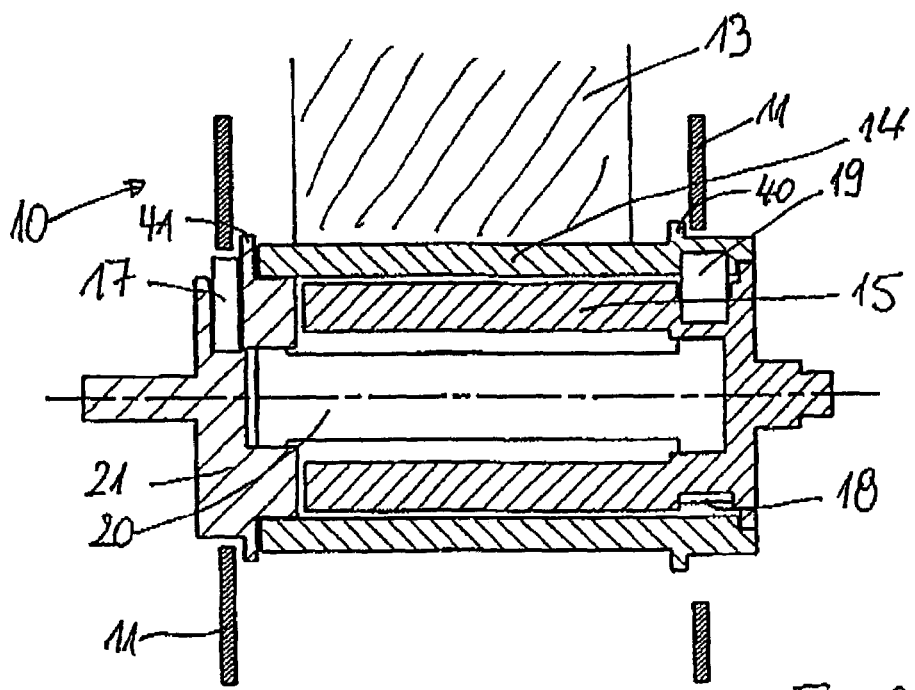

The embodiment illustrated in FIG. 2 has, in addition, a torsion bar 20 integrated into the tensioning drive, the torsion bar being disposed in the interior of the rotor 15 and being connected, on the side thereof to the right as shown in the illustration in FIG. 2, to the rotor 15 with a form-fitting connection. On the opposite side thereof, which is to the left in the illustration in FIG. 2, the torsion bar 20 is connected in a form-fitting manner with a discrete profile head 21 serving as a support for the blocking element 17, whereby the profile head 21 is displaced relative to the rotor 15 and is connected with the stator 14, serving in its role as the shaft body, via a not-herein illustrated but basically conventional manner as illustrated in the state of the art publication DE 196 02 549 A1, namely, structures designed to give way at a preset force application that are, for example, in the form of shear pins.

The function of the embodiment illustrated in FIG. 2 is, with respect to the normal operation of the belt retractor, as well as with respect to the tensioning process, the same as described with respect to the functioning operation discussed with respect to FIG. 1. In the event that, in normal operation, it comes to a belt-sensitive and/or vehicle-sensitive steering in of the blocking element into its blocking position, the profile head 21 is fixedly set in its rotation in the unwinding direction. By reason of the connection of the profile head 21 to the stator 14 serving in its role as the shaft body via structures 42 (see FIG. 3) designed to give way at a preset force application, the stator 14 is also blocked in the unwinding direction. If the electro-motor is controlled to operate as the tensioning drive, the tensioning process completes itself in the same manner as has been described with respect to FIG. 1, whereby, following the controlling into position of the blocking element 17 to begin the tensioning process, with the beginning of the "reverse rotation" of the stator 14 in the winding up direction, the connection between the profile head 21 and the stator 14 in its role as the shaft body is lifted via the destruction of the structures designed to give way at a preset force application. When it now comes, at the end of the tensioning process, to a reversal of the rotational direction of the stator 14 that configures the shaft body, the rotation of the stator 14 in the unwinding direction is converted via the reverse movement stop into a rotation of the rotor 15 in the same rotational direction, whereby, now, a rotation of the rotor 15 relative to the profile head 21, which has been further fixedly set by the blocking element 17, follows, and this relative movement leads to a corresponding force limiting demand of the torsion bar 20 that is activated between the profile head 21 and the rotor 15.

Figure 3:
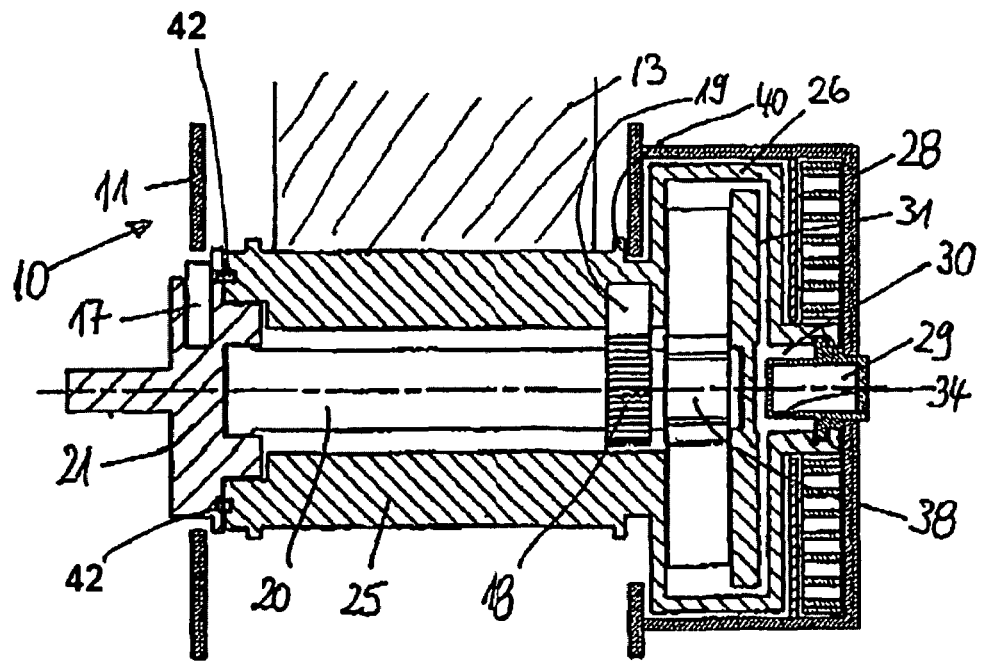
Figure 4:
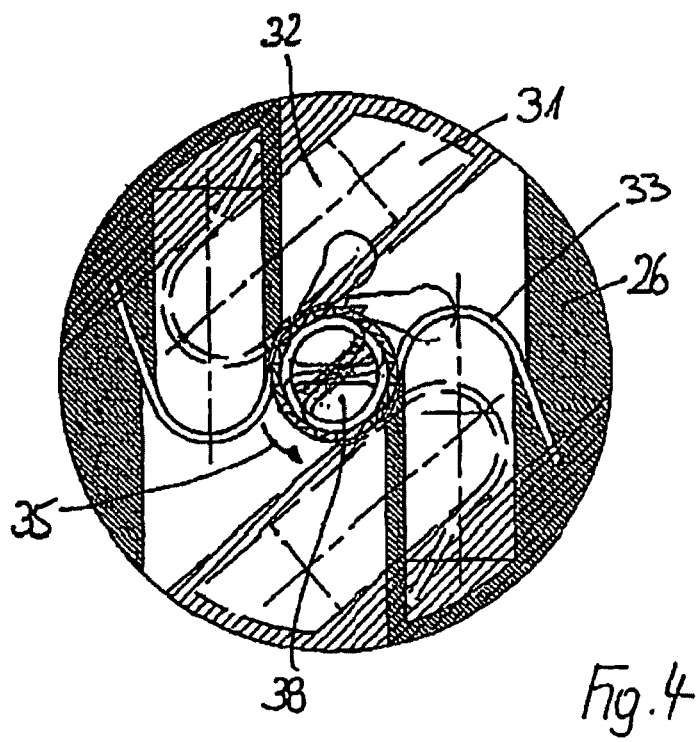
Figure 5:
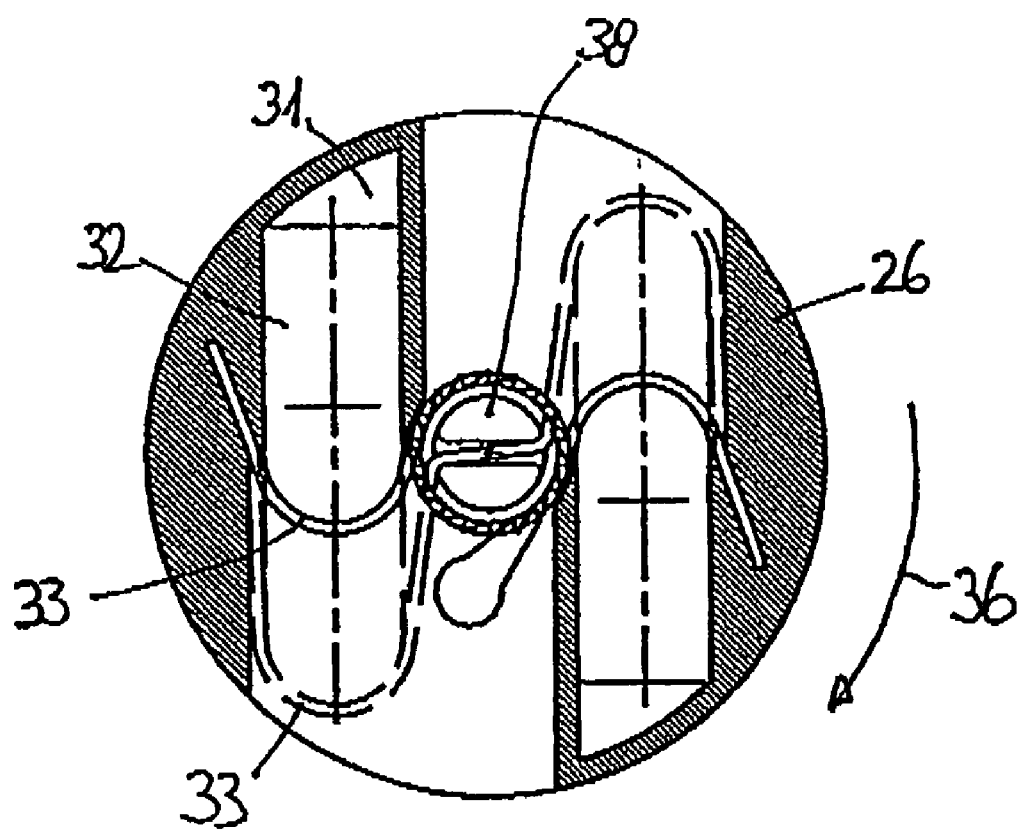

In the embodiment illustrated in FIGS. 3-5, the tensioning drive is configured as a pyrotechnic drive, whereby, in this embodiment, a torsion bar is likewise integrated into the configuration as a force limiting device. This embodiment can be, to be sure, configured as well without a torsion bar.

The pyrotechnic drive is comprised of a housing 26, which is integrally connected as a single piece with a shaft body 25 serving as the support of the belt 13, so that the housing 26 respectively rotates with the shaft body 25. The shaft body 25 is, thus, rotatably supported in the same manner as the stator is supported in the embodiment described with respect to FIGS. 1 and 2 by means of a flange 40 on the associated shank 11 of the housing 10. The housing 26 is gripped by a housing cover 28 mounted on the shank 11, a gas generator 29 being fixedly mounted on the back side of the housing cover. The gas generator 29 projects with a gas exhaust region 34 into the housing 26, which is configured, in this region, with a gas-partitioning space 30.

A wind up spring 37 is disposed between the housing 26 and the housing cover 28, the outer end of the spring being hung on the housing cover and the inner end of the spring being hung on the housing 26 so that the wind-up spring 37 ensures, in a known manner, the reverse rotation of the shaft body 25 with the housing 26.

As can be seen in a collective view of FIGS. 4 and 5, two pistons 32 are longitudinally displaceably arranged within the housing 26 with gas channels 31 extend from the gas partitioning space 30 thereto so that, in the event of a triggering, the gas produced by the gas generator 29 drives the piston 32. As a result, the pistons 32 work together, in a still-to-be described manner, against a shoulder 38 of the torsion bar 20 that is the same as that described with respect to the embodiment shown in FIGS. 1 and 2, and that is arranged in the interior of the shaft body 25. A profile head 21 with a blocking element 17 rotatably supported thereon is disposed on the opposite end of the torsion bar 20, as has been described.

If the above-described belt retractor-belt tensioner-combination is configured with the pyrotechnic tensioning drive without the actuation of a torsion bar, an axial drive shaft can be provided in lieu of the torsion bar, the blocking element 17 being rotatably supported on this axial drive shaft so that the drive movement of the piston 32 can be transferred to the blocking element 17 via the drive shaft provided in lieu of the torsion bar 20.

As can be seen in FIGS. 4 and 5, the gas produced by the gas generator 29 flows, in the event of a triggering, via the gas channels 31 to the pistons 32, which initially effect a rotation of the torsion bar 20 in the belt unwinding direction as is shown by the arrow 35. This rotation leads, as described, to a locking of the other end of the torsion bar 20 via the profile head 21 and the thereon rotatably supported blocking element 17. In the event that the torsion bar 20 or, respectively, its shoulder 38, is fixedly set, the still further effective gas pressure leads to a rotation of the housing 26 in the wind up direction of the housing 26 shown by the arrow 36 as well as a rotation of the shaft body 25 connected therewith, in that, respectively, a belt 33 wound onto the shoulder 38 of the torsion bar 20 and extending therefrom to the respective piston 32 and secured as well to the housing 26 is unwound.

In accordance with a type of recoil principle, there occurs a corresponding rotation of the housing 26. In connection with this rotation of the housing 26, with the shaft body 25, in the belt wind up direction, the latch 19 of the reverse movement stop correspondingly provided on the shaft body 25 moves out of ratchet engagement with the correspondingly configured teeth 18 on the torsion bar 20 so that, upon the conclusion of the tensioning movement, the shaft body 25 is directly blocked in the belt unwinding direction.

As is not further illustrated, in the embodiment shown in FIGS. 3-5, the arrangement of the pistons 32 can be omitted; it is sufficient, for the drive movement, that the belt 33 is in a form by which it is connected to a pre-arched chamber, disposed in the path of the flow of the gas, that is closely disposed to the housing 26; the gas flows into the chamber and directly impacts the belt such that there correspondingly occurs a rotation of the torsion bar 20.

The disclosed details of the subject matter of this item as set forth in the above-described description, the patent claims, the abstract, and the drawings can be important individually as well as in desired combinations for the realization of the invention in its various embodiments.

The specification incorporates by reference the disclosure of German priority document 102 35 543.6 filed Aug. 3, 2002 and PCT/EP2003/007554 filed Jul. 12, 2003.

The present invention is, of course, in no way restricted to the specific disclosure of the specification and drawings, but also encompasses any modifications within the scope of the appended claims.

The invention claimed is:

1. A seatbelt retractor for retracting a security belt windable and unwindable from a belt shaft that is rotatably supported in a housing, the seatbelt retractor comprising:
   a tensioning drive that acts upon the belt shaft and that, upon triggering, rotates the belt shaft in a wind up direction of the security belt, the tensioning drive including a first component that, upon release of the tensioning drive, initially initiates a rotation in a pull out direction and a second component, the two components being set into movement relative to one another upon triggering of the tensioning drive and the tensioning connection being arranged without a connection to the housing of the seatbelt retractor on the belt shaft and rotating in common, before the triggering of the seatbelt retractor, with the belt shaft;
   a reverse movement stop is arranged between the first and second components of the tensioning drive; and
   a blocking element that can be triggered in a belt-sensitive and/or vehicle-sensitive manner for blocking the rotation of the belt shaft in an unwinding direction, the blocking element being retained on the first component and being, via the movement of the first component, steered into its blocking position, the belt shaft being connected with the second component of the tensioning drive, which second component is rotated in the wind up direction by reason of the application of a drive force occurring in connection with the first component that is fixedly disposed, wherein the reverse movement stop is arranged between the first and second components of the tensioning drive and is continuously effective in the extension direction and runs in a free running condition in the wind up direction.

2. A seatbelt retractor according to claim 1, wherein the reverse movement stop is configured as a ratchet stop with a latch that moves out of ratchet engagement with a tooth arrangement upon rotation in the wind up direction.

3. A seatbelt retractor according to claim 1, wherein the tensioning drive is configured as an electro-motor whose stator forms the shaft body that acts as a support for the seatbelt in the role of the second component and whose rotor that retains the blocking element is in the role of the first component.

4. A seatbelt retractor according to claim 1 and further comprising a force limiting device configured as a torsion bar, the torsion bar being arranged in the interior of the rotor and is connected on its one end in a form-fitting manner with a profile head serving as a support for the blocking element retained thereon and is connected on its opposite end in a form-fitting connection with the rotor, whereby the rotor is directly connected with the profile head via structures designed to give way at a preset force application.

5. A seatbelt retractor according to claim 1, wherein the tensioning drive is configured as a pyrotechnic drive with a housing connected to a shaft body supporting the belt in the role of the second component and with at least one drive piece arranged in the housing that is effective on a driveshaft acting in the role as a support for the blocking element and is flow-contacted by the gas produced from a gas generator upon the triggering of the tensioning drive in the role of the first component.

6. A seatbelt retractor according to claim 5, wherein the drive piece is configured as a piston that is flow-contacted by the gas.

7. A seatbelt retractor according to claim 6, wherein, for the purpose of a symmetrical force transmission in the event of a release, it can be provided that pistons are respectively arranged on both sides of the drive shaft in a symmetrical arrangement.

8. A seatbelt retractor according to claim 6, wherein the driveshaft and the piston are coupled with one another via meshing teeth in a manner such that the linear movement of the piston is, upon release of the tensioning drive, converted into a rotational movement of the driveshaft.

9. A seatbelt retractor according to claim 6, wherein a belt is wound onto the driveshaft, wherein the belt is guided over the piston and is secured to the housing such that the linear piston movement leads to an unwinding of the belt from the driveshaft and, consequently, leads to a rotation of the housing relative to the driveshaft that is fixedly retained.

10. A seatbelt retractor according to claim 5, wherein a belt is wound onto the driveshaft and a pre-curved chamber, disposed in the path of the flow of the gas, is closely disposed to the housing such that the flow-contacting of the belt leads to an unwinding of the belt from the driveshaft and, consequently, a rotation of the housing relative to the fixedly set driveshaft.

11. A seatbelt retractor according to claim 5 and further comprising a force limiting device configured as an inner disposed torsion bar that is driven by the piston at its end arranged relative to the tensioning drive and is connected at its opposite end with a profile head serving as a support of the blocking element, wherein the shaft body is connected with the profile head via structures designed to give way at a preset force application.

12. A seatbelt retractor according to according to claim 5 and further comprising a gas generator arranged on a fixedly set cover of the seatbelt retractor and extends with its gas exhaust region into a partitioned gas space configured in the housing of the tensioning drive.

* * * * *